United States Patent
Gopalakrishnan et al.

(10) Patent No.: US 10,965,468 B2
(45) Date of Patent: *Mar. 30, 2021

(54) AUTHENTICATED EXTERNAL BIOMETRIC READER AND VERIFICATION DEVICE

(71) Applicant: Clover Network, Inc., Sunnyvale, CA (US)

(72) Inventors: Narayanan Gopalakrishnan, Newark, CA (US); Yi Sun, Santa Clara, CA (US); Ketan Patwardhan, San Francisco, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,386

(22) Filed: Jan. 29, 2020

(65) Prior Publication Data

US 2021/0014070 A1    Jan. 14, 2021

Related U.S. Application Data

(63) Continuation of application No. 16/509,103, filed on Jul. 11, 2019, now Pat. No. 10,574,466.

(51) Int. Cl.
*H04L 9/32* (2006.01)
*H04L 9/08* (2006.01)
*G06F 21/32* (2013.01)

(52) U.S. Cl.
CPC ............ *H04L 9/3247* (2013.01); *G06F 21/32* (2013.01); *H04L 9/088* (2013.01)

(58) Field of Classification Search
CPC ... H04L 9/0841; H04L 9/3268; H04L 9/3231; H04L 9/088; H04L 9/3242; H04L 9/3247; G06F 21/44; G06F 21/32
See application file for complete search history.

(56) References Cited

U.S. PATENT DOCUMENTS

| 9,619,804 B1 | 4/2017 | Thatte et al. |
| 10,574,466 B1 * | 2/2020 | Gopalakrishnan .... H04L 9/0841 |

(Continued)

OTHER PUBLICATIONS

"Best Fingerprint Scanners That Let You Use Windows Hello on Older PCs", Jun. 30, 2019, available at: https://www.windowscentral.com/best-fingerprint-scanners (Accessed on: Jul. 2, 2019).

(Continued)

*Primary Examiner* — Baotran N To
(74) *Attorney, Agent, or Firm* — Daylight Law, P.C.

(57) ABSTRACT

An external biometric reader and verification device for providing access control to a computing device, and associated methods, are disclosed. The external reader can store and verify biometrics under the control of the computing device and send identity verification messages to the computing device. One disclosed device includes a biometric reader communicatively connected to an external secure microcontroller. The external secure microcontroller stores a set of biometric data and a signing key. The signing key can be injected by a device manufacturer in a controlled key injection room in a manufacturing facility and can be used to sign a certificate. An operating system of the computing device can be programmed to send a request for the certificate, receive the certificate, and predicate control of access to the operating system using the verification messages on verification of the certificate.

26 Claims, 8 Drawing Sheets

(56) References Cited

U.S. PATENT DOCUMENTS

| | | |
|---|---|---|
| 2005/0184855 A1 | 8/2005 | Burchette |
| 2006/0104224 A1 | 5/2006 | Singh et al. |
| 2007/0245153 A1 | 10/2007 | Richtsmeier et al. |
| 2008/0298646 A1 | 12/2008 | Wennergren |
| 2009/0132816 A1 | 5/2009 | Lee |
| 2010/0235912 A1 | 9/2010 | Hermann et al. |
| 2015/0062005 A1 | 3/2015 | Rajendran et al. |
| 2015/0379255 A1 | 12/2015 | Konanur et al. |
| 2017/0104597 A1 | 4/2017 | Negi et al. |
| 2018/0108020 A1 | 4/2018 | Thatte et al. |
| 2019/0087825 A1 | 3/2019 | Bhatt et al. |

OTHER PUBLICATIONS

"How to Log in to your PC with your Fingerprint or Other Device Using Windows Hello", available at: https://www.howtogeek.com/281489/how-to-log-in-to-your-pc-with-windows-hello/https://www.howtogeek.com/281489/how-to-log-in-to-your-pc-with-windows-hello/, (Accessed on; 7/2/2/19).

"Windows Hello biometrics in the enterprise", Aug. 18, 2018, available at: https://docs.microsoft.com/en-us/windows/security/identity-protection/hello-for-business/hello-biometrics-in-enterprise, (Accessed on: Jul. 2, 2019).

Notice of Allowance dated Oct. 17, 2019 from U.S. Appl. No. 16/509,103, filed Jul. 11, 2019, 31 pages.

\* cited by examiner

FIG. 6

600 *CMD_Enroll*

```c
typedef struct fp_cmd_packet {
    uint16_t id;
    uint16_t num_args;
    fp_arg_data_t *arguments;
} fp_cmd_packet_t;

static fp_cmd_packet_t *fp_hal_command(uint16_t command_id, uint16_t num_args)
{
    fp_cmd_packet_t *command;
    fp_arg_data_t args_tx[num_args];

command = (fp_cmd_packet_t *) malloc(sizeof(fp_cmd_packet_t));
    if (!command) {
        ALOGE("Can not allocate memory for fingerprint command\n");
        return NULL;
    } memset(command, 0x0, sizeof(fp_cmd_packet_t));
    memset(args_tx, 0x0, sizeof(fp_arg_data_t) * num_args);
    command->id = command_id;
    command->num_args = num_args;
    command->arguments = args_tx;

return command;
} fp_cmd_packet_t *command = fp_hal_command(CMD_ENROLL, 1);
```

FIG. 7

700 RPC Request Structure

```c
typedef struct __attribute__ ((__packed__)) {
    unsigned int function_id;
    unsigned int size;
    unsigned char func_data[SIZE_OF_FUNC_DATA];
} clover_usb_message;
```

710 Conversion Code

```c
clover_usb_message usb_msg = { 0 };
usb_msg.function_id = CLOVER_FP_DATA_WRITE;
usb_msg.size = size;

for (i = 0; i < size; i++) {
    usb_msg.func_data[i] = cmd_packet[i];
}
```

720 Return Conversion Code

```c
usb_msg.function_id = CLOVER_FP_DATA_READ;
usb_msg.size = size;
status = usb_device_send_data((struct usb_device *)dev, &usb_msg);
if (status == 0) {
    if(strcmp((const char *)usb_msg.func_data, "TIMEOUT!") == 0) {
        result = FPC_COM_RESULT_TIMEOUT;
        continue;
    } for (i = 0; i < size; i++) {
        data[i] = usb_msg.func_data[i];
    }
    result = FPC_COM_RESULT_OK;
    break;
}
```

FIG. 8

800 Operating System Result Notification

```
if (fpc_hcp_arg_check(response, ARG_ID)) {
        arg_data = fpc_hcp_arg_get(response, ARG_ID);
        *match_id = (int)*(arg_data->data);
        if (*match_id == 0xff) {
                ALOGD("Identify: no match\n");
                status = FPC_IDENTIFY_NO_MATCH;
        } else {
                ALOGD("Identify: matched against id %i\n", *match_id);
                status = FPC_IDENTIFY_COMPLETED;
        }
        goto cleanup;
}
```

AUTHENTICATED EXTERNAL BIOMETRIC READER AND VERIFICATION DEVICE

CROSS-REFERENCE TO RELATED APPLICATIONS

This application is a continuation of U.S. patent application Ser. No. 16/509,103, filed on Jul. 11, 2019, which is incorporated by reference herein in its entirety for all purposes.

BACKGROUND

Identity verification is an important feature of modern computerized devices. Computerized devices provide portals to sensitive control systems, confidential information, and personal identity information that should only be accessible to a certain individual or set of people. Aside from security, identity verification can provide a degree of convenience for tracking use of a device or customizing the device for a user. In the case of a multiuser device, the device can use identity verification information to provide data or interfaces that are specifically applicable to a single user or provide a more accurate record of which user conducted which actions using the device. For example, a factory terminal can keep track of which employee used the device to conduct a specific assembly line action. Furthermore, some multiuser devices are designed specifically for identification purposes such as timecard systems that track when an employee clocked in for work, or electronically controlled access points that determine whether a user is authorized to pass through a physical barrier.

Traditional approaches for identity verification include verification operations conducted using various kinds of information that are colloquially referred to as: who you are, what you know, and what you have. Biometric (who you are) information is replacing passwords (what you know) information in an increasing number of applications due to its universality, permanence, and convenience. However, the permanence of biometric information has caused this increase in usage to be accompanied by increased privacy concerns. If a favorite password is compromised by an identity thief, a user can very easily switch to a different arbitrary string of characters. However, if biometric data is compromised, the situation is much more serious. Aside from its permanence, the simple fact that biometric information is a part of one's person leads to an increased level of sensitivity towards the surreptitious acquisition of that information by malicious actors. People that are not usually concerned with permanent personal information like their mother's maiden name being stored externally and used to identify them will sometimes balk at providing a fingerprint or iris scan to a third party.

SUMMARY

This disclosure relates to external biometric reader and verification devices. In particular, the devices are referred to as "external" in that they provide biometric services to associated computing devices from which they are physically discrete. For example, the external device could be a physically separate fingerprint reader connected to a laptop via a universal serial bus (USB) connection. A computing device used as an example throughout this disclosure is a multiuser computing device having an operating system where access to at least one service of the operating system is predicated on the verification of a user's identity via biometric information. The computing device and external device can be physically distinct and can be manufactured and distributed separately, and then subsequently paired by forming a communicative connection between the two devices. The communicative connection could be formed by a wire, such as a USB wire connecting an external port of the computing device to the external device. The external biometric device can provide the computing device with the ability to conduct the aforementioned verification of the user's identity via biometric information using messages sent over the communicative connection.

Specific benefits are realized by embodiments in which the biometric reader and verification device is an external device in that it can be used to augment any device for which biometric access is required with the only requirement being the ability to form a communicative connection between an operating system of that device and the external device, and software modifications to said operating system in accordance with approaches disclosed in the detailed description below. Furthermore, specific benefits are realized by embodiments in which the computing device is a multiuser device because biometrics are stored locally at the external device, and the external device can be made much more secure as compared to a computing device that has not been optimized for the secure storage of biometric information. Furthermore, specific benefits are realized by conducting biometric verifications on the external device because the biometrics themselves do not need to be sent through a network or even sent across a dedicated inter-device connection.

Although the use of an external device for biometric verification provides certain benefits as outlined above, there are also certain technical problems that arise from embodiments that utilize this approach. For example, since the biometric verification is now conducted externally, care must be taken to assure that the verification messages are provided by a device which has been authenticated to the computing device. Otherwise, spoofed authentication messages could be provided from a malicious device posing as an authenticated biometric verification device in order to obtain unauthorized access to the computing device.

FIG. 1 illustrates a system operating in a first scenario 100 in which multiple users 101, 102, and 103 are registered to use a computing device 130. The computing device 130 is secured by registering users 101, 102, and 103 as registered users for at least one service provided by computing device 130. Access to computing device 130 is subsequently predicated on a user verifying their identity via the delivery of biometric data to external device 110. The verification data for which the identity of the users is verified can be biometric data stored by external device 110. The illustrated external device includes a reader for reading biometric information from the user and a secure microcontroller 120 embedded within external device 110. The secure microcontroller 120 includes a library of biometric data that will be used for verification and a secure processor for conducting the verification of a new sample of biometric data against that library. Secure microcontroller 120 can also include a secure connection to computing device 130 either directly via a connection driver on secure microcontroller 120, or indirectly via another component of external device 110. External device 110 can provide verification messages 121 to computing device 130 to verify the identity of any of users 101, 102, and 103 even if computing device 130 has not been optimized for the storage of biometric data. At the same time, users 101, 102, and 103 can be confident in providing biometric data to external device 110 because it is optimized for such storage and there is no way in which the biometric data can be removed from the external device.

FIG. 1 illustrates computing device 130 operating in a second scenario 150 to illustrate one potential issue that may interfere with the operation of the system in the first scenario 100. As computing device 130 does not store the biometric information of users 101, 102, and 103, potential security vulnerabilities of computing device 130 are isolated from that biometric information. However, as stated above, the external device now opens a new vulnerability in that a malicious agent 151 could provide a spoofed verification 152 in response to a request for verification from computing device 130. The malicious actor could be a customized device used to spoof computing device 130 over the port used to receive verification messages. To ameliorate this vulnerability, computing device 130 can be augmented to only accept verification messages from a device such as external device 110 after trust has been established with the device.

In specific embodiments of the invention, trust is established between the external device and the computing device by authenticating the external device to the computing device. The authentication could involve the use of a private signing key stored on the external device. The private signing key could be used to sign a certificate on the external device. The certificate could then be sent from the external device to the computing device where the signature could be verified. The private signing key could be provided by a root signatory for which computing device 130 is able to verify certificates through use of a public verification key. The private signing key could be injected into the external device in a secure key injection facility in the manufacturing facility used to produce the external device. The private signing key could alternatively be injected into the device using a remote server-based injection procedure such as remote key injection (RKI). The public verification key could be stored in memory on computing device 130 either while the device is being manufactured, or later when computing device 130 is being augmented to function with an external biometric reader such as external device 110.

In specific embodiments of the invention, the process of authenticating the external device to the computing device can involve the generation of a shared secret which is shared between the computing device 130 and the external device 110. The shared secret can be used to form a secure connection between the devices. In specific embodiments of the invention, the shared secret could be generated using cryptographic material exchanged between the two devices through the process of verifying the certificate described in the prior paragraph. The shared secret could be used to generate a message authentication code (MAC) which is combined with each message between the external device and the computing device. For example, verification message 121 could be combined with the MAC, as derived from the shared secret, and sent from external device 110 to computing device 130 in encrypted format. Computing device 130 could then authenticate verification message 121 by decrypting the message and verifying the MAC.

In specific embodiments of the invention, the security of the system is enhanced by re-provisioning the external device each time the external device is first connected to the computing device. In these embodiments, all the biometric data on the external device can be removed the first time the external device is connected to the computing device. Although this may result in certain users being required to re-register with the system, it avoids the possibility of users verifying themselves with biometric data stored on the external device while those users are not in reality registered to operate the computing device. These embodiments provided an additional benefit in that, even if those users are not malicious actors attempting to gain access to the system, if a rightful owner of the computing device has multiple external devices and computing devices, they do not need to worry about cross-pollinating authorization to use specific devices if they need to swap out external devices that were previously used for other users and other computing devices.

In specific embodiments of the invention, the system comprising the external device and the computing device can be referred to as operating in a setup phase while trust is being established between the two devices and a secure authenticated connection between the devices is being formed. The creation of the secure authenticated connection can utilize a shared secret between the two devices. In specific embodiments of the invention, the system can be referred to as operating in an operational phase after trust has been established. In the operational phase, the computing device can use the external device to request and conduct biometric identity verification for users that require access to the computing device. The computing device can switch the system from the setup phase to the operational phase upon establishing trust with the external device, such as by verifying a certificate provided by the external device and establishing a secure authenticated connection between the devices.

In specific embodiments of the invention, a computerized method for controlling access to a computing device is provided. The method includes instantiating an operating system on the computing device, storing a private signing key on an external secure microcontroller, and sending, from the computing device, a certificate request to the secure microcontroller via an external port of the computing device. The method also includes signing, on the external secure microcontroller, a certificate: (i) using the private signing key; and (ii) in response to receiving the certificate request. The method also includes verifying, on the computing device, the certificate. The method also includes storing a set of biometric data on the external secure microcontroller. The method also includes receiving, on the external secure microcontroller, biometric sample data from a biometric reader. The biometric sample data is data provided by a user on the biometric reader in order to verify their identify, such as an image of a fingerprint pressed against the biometric reader. The method also includes verifying, on the external secure microcontroller, the biometric sample data against the set of biometric data. The method also includes transmitting, from the external secure microcontroller, an authentication signal to the operating system upon verifying the biometric sample data. The method also includes authorizing access to the operating system based on the verification of the certificate and the authentication signal.

In specific embodiments of the invention, a system for controlling access to a computing device is provided. The system comprises an operating system instantiated on the computing device, an external port located on the computing device, an external secure microcontroller: (i) communicatively connected to said computing device via said external port; (ii) storing a set of biometric data; and (iii) storing a private signing key, and a biometric reader communicatively connected to said external secure microcontroller. The external secure microcontroller is programmed to: (i) sign a certificate with the private signing key in response to receiving a certificate request from the computing device; (ii) receive biometric sample data from the biometric reader;

(iii) verify the received biometric sample data against the set of biometric data; and (iv) transmit, upon verifying the received biometric sample data, an authentication signal to the operating system of the computing device via said port. The operating system is programmed to: (i) send a certificate request to the secure microcontroller; (ii) verify the certificate; and (iii) predicated on verifying the certificate, allow access to the operating system based on the authentication signal.

In specific embodiments of the invention, a system for controlling access to a computing device is provided. The system includes an operating system instantiated on the computing device, an external port located on the computing device, an external secure microcontroller: (i) communicatively connected to said computing device via said external port; (ii) storing a set of biometric data; and (iii) storing a certificate, and a biometric reader communicatively connected to said external secure microcontroller. The external secure microcontroller is programmed to send the certificate to the computing device in a setup phase and verify received biometric data and send authentication signals to the computing device based thereon in an operational phase. The computing device is programmed to receive and verify the certificate in the setup phase, switch the system to the operational phase based upon verifying the certificate, and control access to the operating system based on the authentication signals in the operational phase.

BRIEF DESCRIPTION OF THE DRAWINGS

FIG. 6 is a code snippet written in the C programming language which provides the definition of the structure of a command packet and the code to create a CMD_ENROLL command packet in accordance with specific embodiments of the invention disclosed herein.

FIG. 7 is a set of code snippets written in the C programming language which provide the structure of a remote procedure call (RPC) request, conversion code for converting a command packet into an RPC request, and return conversion code for converting an RPC response into a function return in accordance with specific embodiments of the invention disclosed herein.

FIG. 8 is a code snippet written in the C programming language which provides the structure of the operating system authentication result response from an RPC in accordance with specific embodiments of the invention disclosed herein.

DETAILED DESCRIPTION

Figure 1:
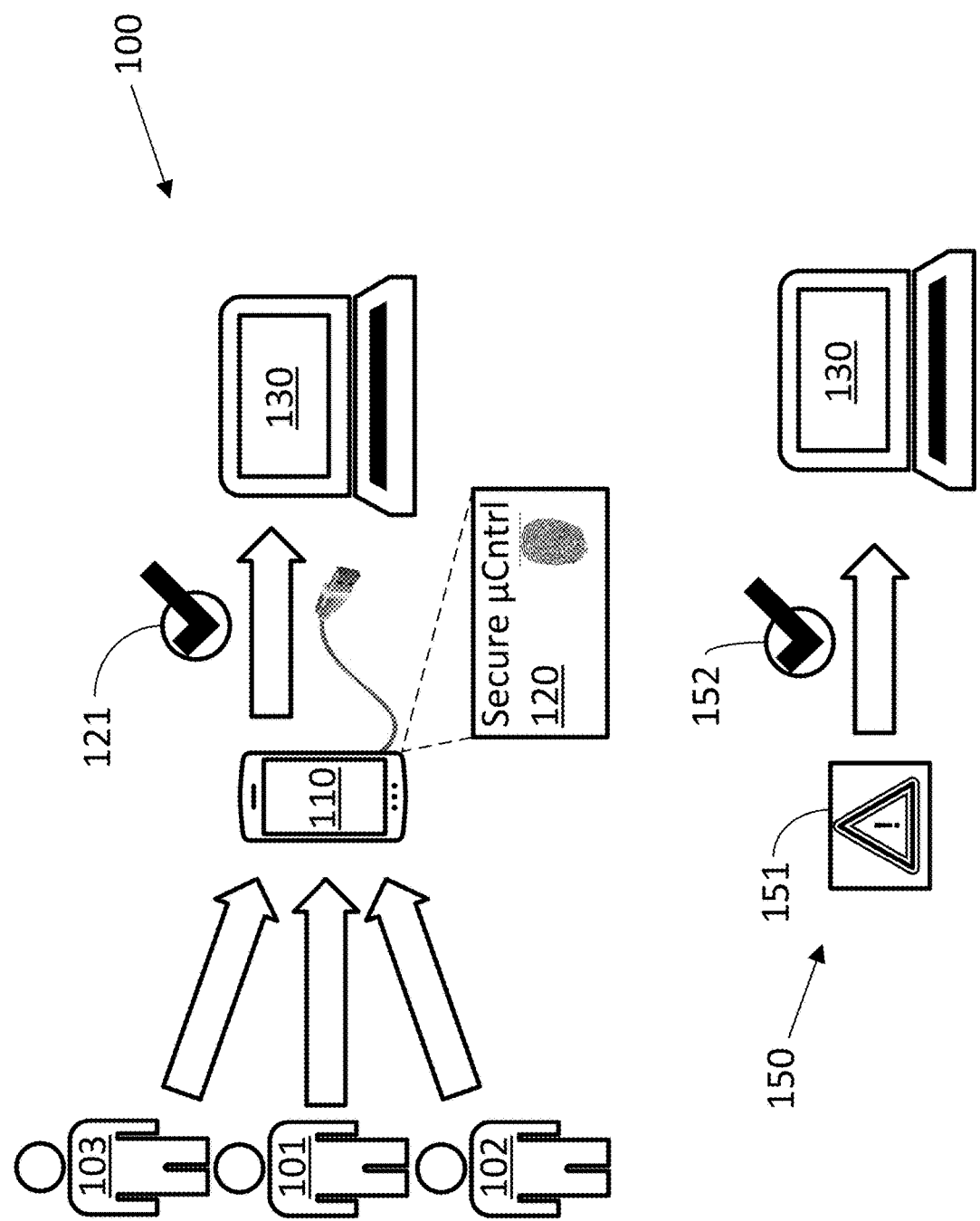
FIG. 1 is a block diagram of an external biometric reader and verification device for providing access to an associated computing device in accordance with specific embodiments of the invention disclosed herein.

Methods and systems related to external biometric reading and verification devices used to provide access to computing devices in accordance with the summary above are disclosed in detail herein. The methods and systems disclosed in this section are nonlimiting embodiments of the invention, are provided for explanatory purposes only, and should not be used to constrict the full scope of the invention. Throughout this disclosure the example of an external biometric reader, in the form of a fingerprint sensor with an accompanying secure microcontroller, is utilized as an example. However, the biometric reader can include any type of biometric sensor and can sense any type of biometric information including fingerprint data, hand size data, retina data, vein pattern data, iris data, facial recognition data, vocal signature data, or any other kind of biometric information. Furthermore, in specific embodiments of the invention, the secure microcontroller can be replaced with any kind of physically or logically secured computerized device such as a secure processor, a dedicated secure application specific integrated circuit (ASIC), a secure board, or a secure logically isolated software layer.

In specific embodiments of the invention, the computing device can take on various forms. The computing device could be a workstation, a laptop computer, a smartphone, a tablet, or any other type of computing device that can provide services for which a user would be allowed access via the verification of their identity using biometric information. The computing device can have user interfaces such as a touch screen, keyboard, display, speaker, microphone, and others. The computing device can include an operating system such as the iOS, Android, Windows, DOS, Unix, Linux, or alternative operating systems. In specific embodiments of the invention, the operating system will be modified to interoperate with and authenticate the external biometric readers disclosed herein. Throughout this disclosure, providing access to at least one service provided by the operating system is used as an example of providing access to the computing device. However, specific embodiments of the invention are more broadly applicable to providing access to any service provided by the computing device regardless of whether it includes an operating system.

In specific embodiments of the invention, access to the computing device is predicated on verification of a user's identity using biometric information sampled from the user on the external device. Access to the computing device can include access to services provided by the computing device. In specific embodiments of the invention in which the computing device has an operating system, access to the computing system can be provided by providing the user with access rights under the operating system including access to services available under the operating system. The services provided by the computing device can be used to control alternative devices. For example, the computing device could allow for control of industrial machinery in a factory such as an industrial oven for curing rubber. As another example, the computing device could be a physical security access control device which allows for control of an actuator controlling a physical barrier such as a door lock or turnstile. The services provided by the computing device can be used to store or access secured information. For example, the computing device could be a time-card machine and allow for entry of the time into a database storing the time a user accessed the system. As another example, the computing device could allow access to confidential information. For example, the computing device could be a POS device and verification of an employee's identity could be required before the device would function.

In specific embodiments of the invention, the computing device may be a multi-user device that is designed to be operated by multiple users at different times thus requiring multiple users to be able to verify their identities with the device in order to operate it. For example, the computing device could be a shared control for an industrial robot in a factory, a timecard machine, a physical barrier access controller in a shared work space, or a point of sale terminal or general workstation intended for use by multiple employees in a shared work space during their different shifts. In specific embodiments of the invention, the computing device may not have its own biometric sensor. In these embodiments, the external biometric device can provide biometric identity verification services that would otherwise not be available to the computing device. However, in specific embodiments of the invention, the computing device does have its own biometric sensor, but the external biometric reader is still utilized in order to realize the benefits of the compartmentalized storage and verification of biometric information on a dedicated, separate device. As stated previously, the benefit of isolated storage is particularly acute in the case of shared devices where a user is not always in control of the device that will store their biometric information, and therefore may feel as though their biometric information could potentially be exposed outside of their control.

In specific embodiments of the invention, the computing device can be connected to the external device using a secure connection. The secure connection can be used to send operational messages between the external device and the computing device. The operational messages can include requests for biometric verification, confirmation of such verification, denial of such verification, and ancillary messages used to support the functionality of the external device in providing biometric verification services for the computing device. These ancillary messages can include labels used to identify specific users that are being enrolled to access services provided by the computing device which the external device will store in association with that user's biometric information. As such, the computing device will be able to request biometric verification services for a user by delivering a label for the user that is distinct from the biometric information and will not need access to the biometric information at any time. The secure connection can be formed as part of the establishment of trust between the two devices. The combined system of the computing device and external device can be referred to as operating in a setup phase of operation prior to when the secure connection has been established, and an operational phase of operation after the secure connection has been established.

The secure connection can be provided over a wired or wireless communicative connection between the external device and the computing device. The communicative connection could be: a wired connection such as USB, serial peripheral interface (SPI), or universal asynchronous receiver/transmitter (UART); or a wireless connection such as Bluetooth, infrared (IR) communication protocols, or Zigbee. The computing device can include an external port for establishing the communicative connection with the external device. The characteristics of the port will depend upon the characteristics of the communicative connection between the devices. For example, if the secure connection were provided by USB, the computing device would include a USB port. The port could be used to establish trust between the devices, form a secure connection, and send and receive operational messages to and from the external device. However, different ports and communicative connections could be used for each of these actions. For example, trust could be established between the devices via a wired connection while the secure connection and operational messages could be sent via a wireless connection.

In specific embodiments of the invention, the secure connection can be formed through various means. The secure connection can be formed through cryptographic means or through use of pre-stored fully stochastic shared secrets on both the devices. Cryptographic means that could be applied include an asymmetric key exchange or the simultaneous generation of a shared secret key using a shared secret key exchange algorithm such as a Diffie-Hellman key exchange. Fully stochastic shared secrets could be pre-stored on each device. However, this could limit the flexibility of the system in that each computing device and external device would subsequently be limited to pairing with a pre-matched device or set of devices from the other category with a matching shared secret. The computing device and the external device can each include key generators for purposes of generating the cryptographic material for the asymmetric keys or the shared secret key. The key generators can use elliptic-curve cryptography or Rivset-Shamir-Adleman (RSA) cryptography. The key generators on one or both types of devices can be configured to generate public keys and accompanying private keys. The key generators can also, or in the alternative, be configured to generate the shared secret key mentioned above. The shared secret key can be generated simultaneously on each device through the exchange of cryptographic material between the devices.

Figure 2:
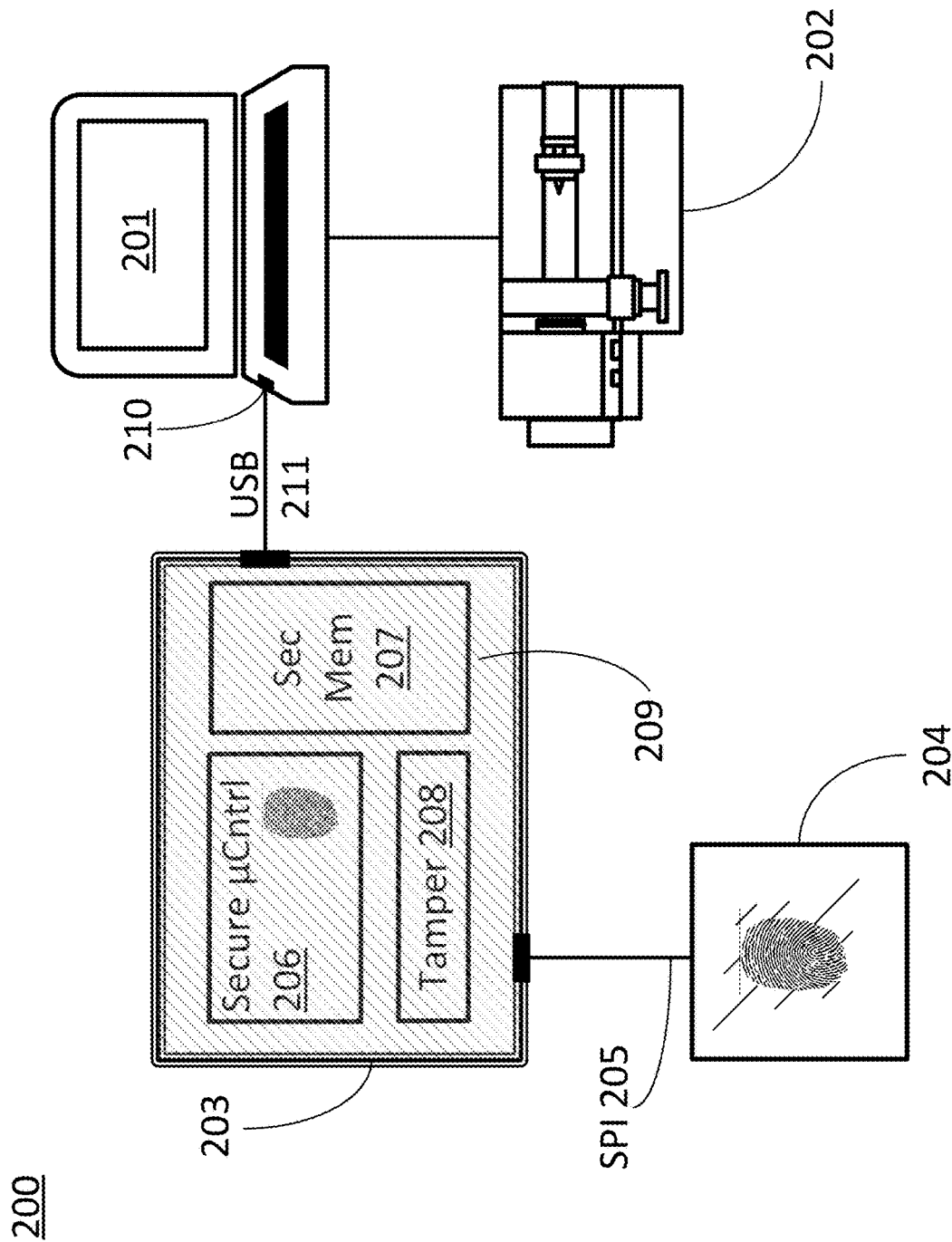
FIG. 2 is a block diagram of an external biometric reader and verification device with a secure memory for providing access to an associated multiuser computing device in accordance with specific embodiments of the invention disclosed herein.

FIG. 2 includes a block diagram of a system 200 having several components in accordance with specific embodiments of the invention. System 200 includes a computing device in the form of a terminal 201 for controlling a lathe 202, an external secure board 203, and an external fingerprint module 204. The fingerprint module 204 and the external secure board 203 could be discrete devices, or they could be integrated into a single device such as by being mounted inside a single casing. The two components operate in combination to provide the functionality of certain embodiments of the external biometric reading and verification device disclosed herein. In the illustrated case, the fingerprint module 204 serves as a biometric reader in that it includes a glass surface for placement of a user's finger and a camera for taking an image of the fingerprint. The image is then sent on an SPI bus 205 to external secure board 203. The external secure board 203 serves as a biometric verification device in that it stores a library of biometric data used to analyze and verify the biometric sample received from the biometric reader—fingerprint module 204 in this case. The external secure board 203 includes a secure microcontroller 206, a secure memory 207, and a tamper sensor 208. The secure memory 207 can be a nonvolatile flash memory that stores a private signing key which is injected into the external secure board 203 when the board is manufactured. The secure memory 207 can also be used to store the biometric library. The secure memory can be accessible to the secure microcontroller 206 via an SPI connection. The secure memory could be a secure Quad SPI flash.

Certain benefits accrue to embodiments in which the connection between the fingerprint module and the secure board is located internal to a common casing to avoid the illicit acquisition of biometrics on a snooping device attached to the connection between the module and the secure board. Additional security measures such as a tamper mesh can be added to protect this connection. However, since the biometrics on this connection are disassociated from any accompanying user identity information they are slightly less of a concern than the biometric information on secure memory 207 which may be stored with a label for a particular user as an index for the biometric library of user data.

In specific embodiments of the invention, secure board 203 can be augmented to include various security features to protect the private signing key and biometric library. As illustrated, secure board 203 includes a tamper sensor 208 and a tamper mesh 209 which cover the components of the secure board to avoid malicious actors from accessing the data stored on the secure board 203. In particular, the tamper sensor 208 could detect a tamper on tamper mesh 209, such as an attempt to remove a portion of the tamper mesh and trigger the deletion of the secure memory in response. In specific embodiments of the invention, secure memory 207 is a volatile memory and the deletion of the secure memory by tamper sensor 208 involves removal of power from the volatile memory. In specific embodiments of the invention, secure memory 207 is a nonvolatile memory and deletion of the secure memory by tamper sensor 208 involves an active deletion action from tamper sensor 208 such as driving an erase signal to ground.

As illustrated, computing device 201 includes an external USB port 210 which is connected via a USB cable 211 to secure board 203 to form a communicative connection between computing device 201 and secure board 203. System 200 could switch from a setup mode to an operational mode upon forming a secure connection over USB cable 211. During the operational mode, a user could be permitted to operate lathe 202 via computing device 201 by providing a fingerprint to fingerprint module 204 and waiting while the secure board 203 verified their identity as authorized users of lathe 202. The computing device could then track which user operated lathe 202 in the execution of specific actions. Computing device 201 could likewise, in the operational mode, utilize fingerprint module 204 to enroll a user as an authorized user for later identification via their fingerprint. The enrollment and verification of a user's identity could all be conducted via authenticated operational messages sent over USB cable 211.

In specific embodiments of the invention, the system could be designed so that the external device and the computing device are operated by different users. In these embodiments, the user with ready access to the external device could be a master user capable of enabling the combined system to be operated by the two users. In specific embodiments of the invention, the system could be designed to allow multiple computing devices to be accessed based on authorization provided by a single master user at a single external device, or multiple users to access the single computing device. In the example of FIG. 2, a shift manager could, in this manner, provide authorization to allow multiple workers to operate different equipment in an assembly line by providing a fingerprint to fingerprint module 204. In these embodiments, the communicative connection between the external device and the multiple computing devices could be a network connection. The network connection could be a wired connection such as a TCP/IP connection or an Ethernet connection, or a wireless connection such as a Wi-Fi connection. In either situation, the approaches disclosed above for creating a secure connection between an external device and a computing device could be used to encrypt the traffic between the various devices.

In specific embodiments, the external device could include its own user interface devices in addition to any user interface devices on the computing device. For example, the computing device could be a customer facing device in a POS system, such as a keypad for allowing a user to enter their PIN number or swipe a credit card, while the external device was a merchant facing device in that same POS system, such as a merchant terminal. An employee authorized to operate the POS system could then provide access to the combined system by providing biometric information using a biometric reader at the merchant terminal which would enable operation of the overall POS system. In keeping with the previous example, the external device could be a merchant facing POS terminal augmented with a secure board such as secure board 203 and a fingerprint module 204. The fingerprint module 204 and the secure board 203 could be provided in the same casing as the merchant user interface device (e.g., a touch screen). In these embodiments, SPI 205 could be internal to the casing. In specific embodiments of the invention, both users will access services provided by computing device 201 via a user interface device on computing device 201 and a user interface device collocated with the external device (e.g., secure board 203 and fingerprint reader 204). Embodiments in which different users operate the different devices thereby provide further benefits when biometric authorization is provided at the external device because the user providing authorization may already be in the vicinity of the external device and can therefore more easily provide authorization when operating their portion of the system.

In specific embodiments of the invention, the user interfaces on both the computing device and the external device can include displays. These displays can both be driven by a processor on the computing device. In specific embodiments of the invention, both displays will be controlled by an operating system on the computing device. The display associated with the external device can receive display data via the same connection used to establish trust with the external device. The display associated with the external device can receive display data via the same communicative connection which is secured in the setup phase of operation of the overall system. In the example of FIG. 2, the display data for the display associated with the external device could be sent over USB 211. However, an alternative connection could be used for the display data and for the operational messages associated with biometric verification.

In specific embodiments of the invention, the system could be designed to allow for trust to be established using data that is pre-stored on both devices. In specific embodiments, trust can be established by pre-storing a private signing key on the external device and a public verification key on the computing device. In these embodiments, the private signing key can be used to sign a certificate, which is sent to the alternative device, and verified thereon using the public verification key. The private signing key could be provided by a root signatory for which computing device is able to verify certificates through use of a public verification key. The private signing key could be injected into the external device in a secure key injection facility in the manufacturing facility used to produce the external device. The private signing key could alternatively be injected into the device using a remote server-based injection procedure such as RKI. In other embodiments, the pre-stored data could be a shared secret directly embedded in the two devices. In these embodiments, an encrypted exchange of the shared secret, or portions thereof, would allow for one- or two-way trust to be established between the devices without the need for the generation of any cryptographic material by either device. However, the devices would be limited in the number of alternative devices they could securely connect to based on which devices they were pre-matched with to carry the same shared secret.

Figure 3:
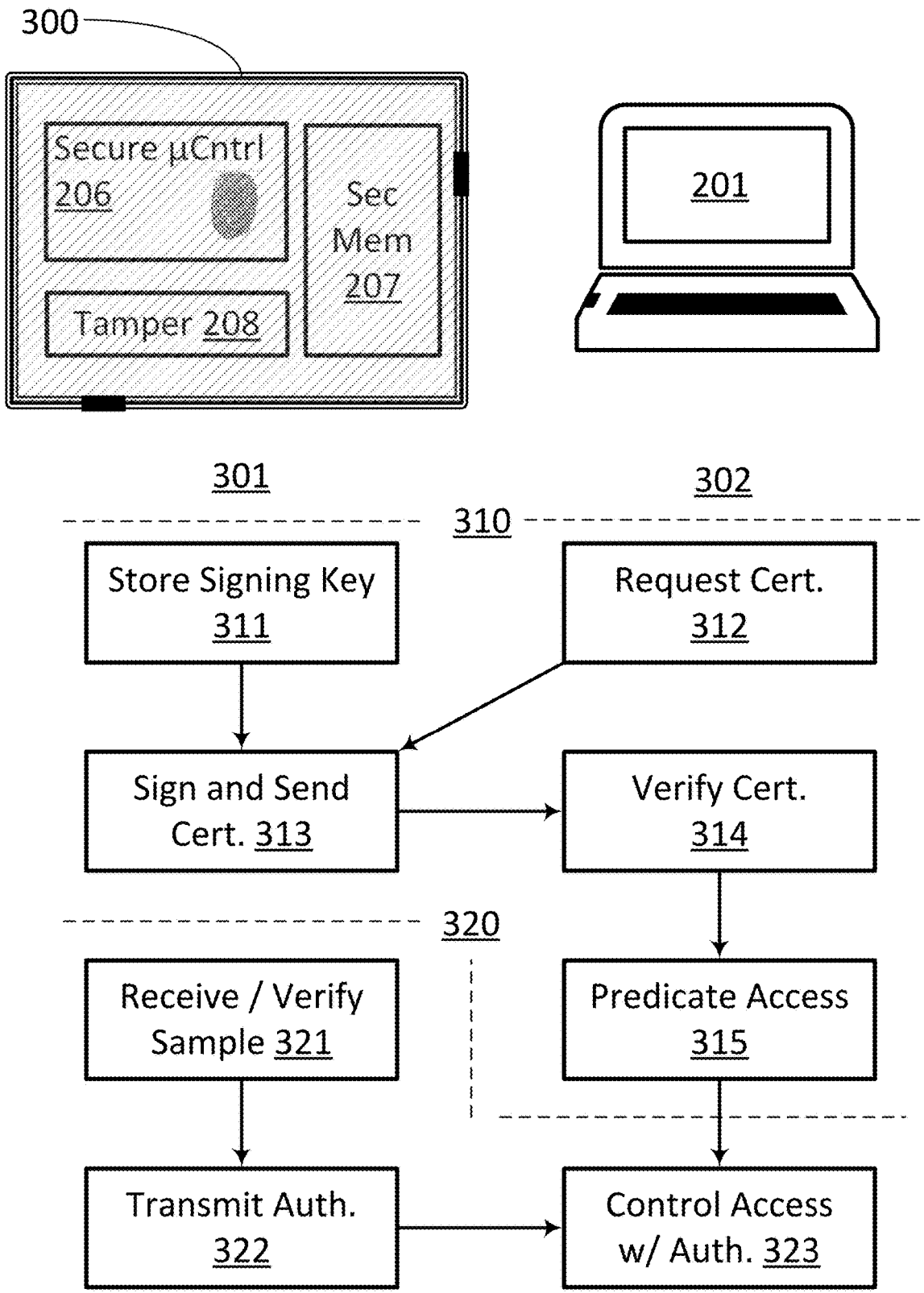
FIG. 3 is a flow chart for a set of methods for a setup mode and an operational mode for an external biometric verification device with a secure memory for providing access to a computing device in accordance with specific embodiments of the invention disclosed herein.

FIG. 3 illustrates a specific example of the embodiments described immediately above in which trust is established between a biometric verification device 300 on an external device and a computing device 201, and a secure connection is subsequently formed between those devices in a setup phase 310. FIG. 3 also illustrates how the establishment of trust and the formation of the secure connection can be used as a prerequisite to the initiation of an operational phase 320. FIG. 3 also illustrates how the biometric verification device 300 can be used to provide identity verification services for a computing device 201 upon commencement of the operational phase 320 and predicated on the completion of the setup phase 310. In FIG. 3 steps of the flow chart occurring in the left column 301 are conducted on the and by the external device while steps of the flow chart occurring in the right column 302 are conducted on and by the computing device.

Setup phase 310 involves the establishment of trust between the biometric verification device 300 and computing device 201 and the creation of a secure connection between those two devices. Step 311 includes storing a private signing key on the external device. The key can be stored in secure memory 207. The key can be injected into secure memory 207 in a key injection facility when the device is manufactured. In these embodiments, secure memory 207 can be read only memory (ROM), nonvolatile memory (e.g., flash, PROM, or EPROM), or volatile memory (e.g., SRAM).

The process of pairing the two devices begins with step 312 in which computing device 201 sends a certificate request to the biometric verification device 300. The certificate request can be sent over a wired connection (e.g., a USB) upon connecting an external device to an external port on computing device 201. The computing device 201 can be programmed to send this message automatically upon detecting the connection or in response to a user command.

Step 313 involves the biometric verification device 300 signing the certificate with the private signing key and in response to the receiving of the certificate request from computing device 201. The step of signing the certificate can be conducted by secure microcontroller 206 using a key stored in secure memory 207. The private signing key is used to sign the certificate but is not otherwise exposed outside of the secure environment formed by the security features of biometric verification device 300. Step 313 can also involve the external device transmitting the signed certificate back to the computing device 201. The signed certificate can be sent along the same connection used to request the certificate in step 312.

The process continues with step 314 in which the signed certificate is verified by the computing device 201. Step 314 can be conducted using a public verification key which can be used by the computing device 201 to check to see if the certificate of the external device was issued by a root certificate authority. In specific embodiments of the invention, the root certificate authority will be a manufacturer of both the computing device 201 and the biometric verification device 300. However, in other embodiments, the manufacturer of computing device 201 will have a formalized relationship with the manufacturer of biometric verification device 300 to assure that the root certificate authority is trusted by computing device 201.

The transition to the operating phase of the system can be predicated on the verification of the certificate in step 314. As such, authorizing access to the computing device 201 can be predicated on both the verification of the certificate in step 314 and the provisioning of valid biometric information during the operational phase. FIG. 3 therefore includes a step 315 of predicating access based on the verification of the certificate in step 314. If the certificate is verified, step 315 results in the system switching from setup mode 310 to operational mode 320.

As mentioned, FIG. 3 also illustrates the system functioning in the operational mode 320. The operational mode is show as beginning with a step 321 in which the external device receives and verifies a sample biometric. For example, a fingerprint module could receive a picture of a user's fingerprint and transfer the picture to secure microcontroller 206. Secure microcontroller 206 could then compare the fingerprint to a library of stored biometrics to verify the identity of the user that provided the fingerprint. Step 321 can be predicated by a request for identity verification sent from computing device 201. The identity request can be sent via an authenticated message from computing device 201 and include a label for the user for whom access is being authorized. Upon verifying the identity of the user in step 321, the external device could transmit an authorized user message to the computing device in step 322. The authorized user message and the request for identity verification could be operational messages sent via the secure connection between computing device 201 and the external device. In response to the authorized user message, the computing device could execute step 323 in which access to at least one service of the computing device is controlled based on the authorized user message. As the system would not have switched to the operational mode unless the biometric verification device 300 was first authenticated, the execution of step 323 is predicated on both the biometric identity verification conducted by the biometric verification device, and the authentication of that biometric verification device.

In specific embodiments of the invention, messages between the computing device and the external device can be authenticated to assure that the system is not being attacked by a malicious party issuing spoofed operational messages to the external device for purposes of obtaining the biometric data or to the computing device for purposes of obtaining unauthorized access to the services of the computing device. In specific embodiments of the invention, the messages can be combined with a message authentication code (MAC) which can be appended to each message and encrypted with the message. In specific embodiments of the invention, authentication will be provided by a hash-based message authentication code (HMAC) which hashes a MAC with the message at least one time and encrypts the combined hash. The encryption scheme utilized can be any kind of symmetric or asymmetric cipher. For example, the encryption scheme could be 128-bit, 192-bit and 256-bit AES, RSA, SQUARE, CRYPTON, ARIA, Camellia, Data Encryption Standard (DES), Triple Data Encryption Standard/Algorithm (TDES/TDEA), Blowfish, Serpent, Twofish, Threefish, Secure and Fast Encryption Routine (SAFER), International Data Encryption Algorithm (IDEA), Tiny Encryption Algorithm (TEA), extended TEA (XTEA), and others. In specific embodiments of the invention, the MAC can be derived from a shared secret used to create the secure connection to the computing device. However, in other embodiments a different shared secret will be used to create the MAC that is separate and distinct from the purely stochastic or cryptographic material used to create the secure connection.

In specific embodiments of the invention, security is enhanced by re-provisioning the external device each time the external device is first connected to a computing device. In these embodiments, all the biometric data on the external device can be removed the first time the external device is connected to the computing device. This process can be initiated by a specific message sent from the computing device such as a re-provision command. However, the external device could also be configured to automatically detect a power off event or new connection event and automatically remove its stored biometric data in response to either occurrence.

Figure 4:
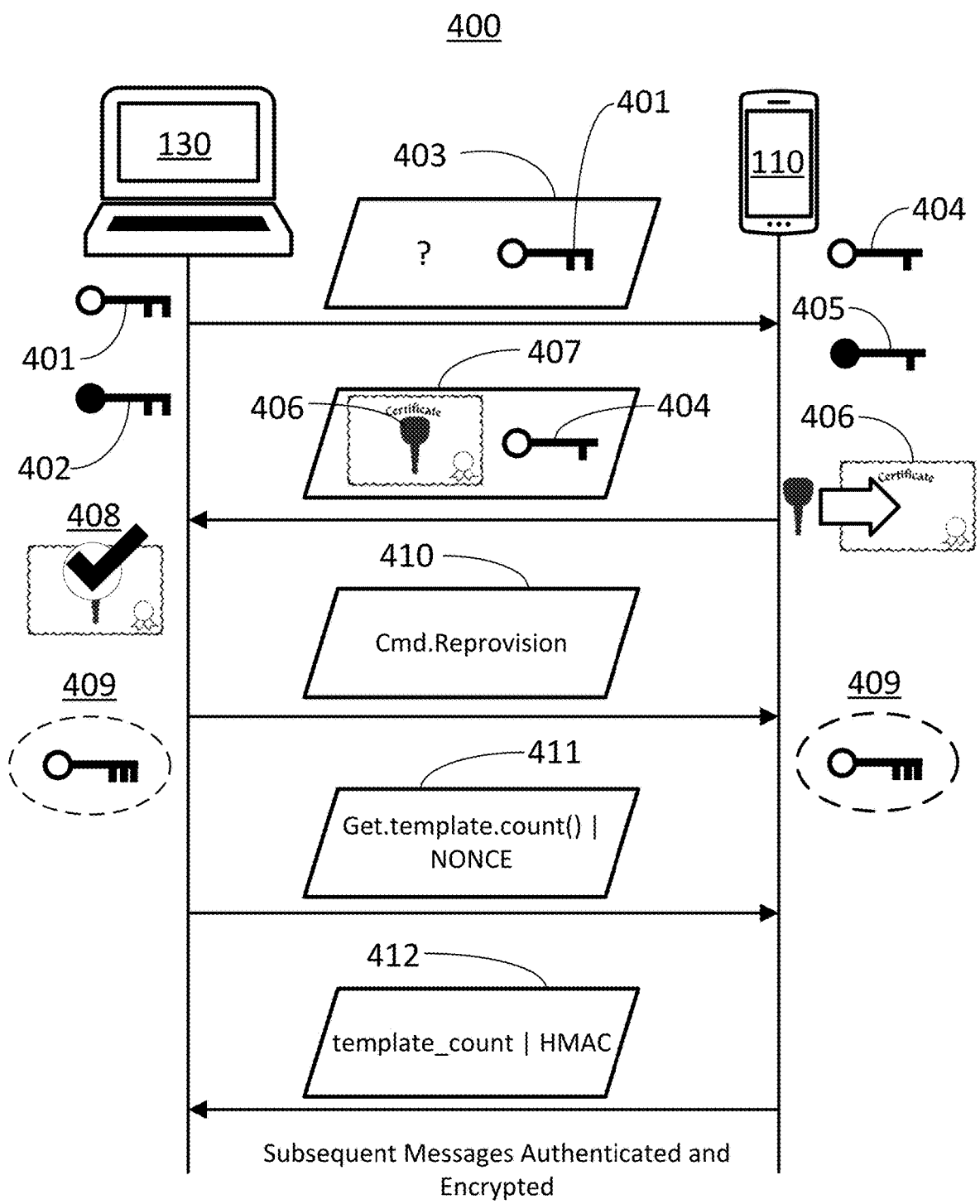
FIG. 4 illustrates a ladder diagram for a set of methods for authenticating an external biometric reader and verification device to a computing device in accordance with specific embodiments of the invention disclosed herein.

FIG. 4 is a ladder diagram 400 for a set of methods for authenticating an external biometric reader and verification device 110 to a computing device 130 and for forming a secure connection between those devices in accordance with specific embodiments of the invention disclosed herein. In the embodiments represented by ladder diagram 400, both devices include key generators that generate ephemeral key pairs and a shared secret using a shared secret key generator algorithm such as a Diffie-Hellman key generator algorithm. In the embodiments represented by ladder diagram 400, external biometric reader and verification device 110 has been pre-provisioned with a private signing key from a root certificate authority and computing device 130 has been pre-provisioned with an associated public verification key. As such, the ladder diagram can be preceded by a step of injecting the private signing key on the external device in a secure key injection facility. The key can be injected on a secure microcontroller of the external device.

Ladder diagram 400 begins with the generation of a set of encryption keys on computing device 130 and a set of encryption keys on external biometric reader and verification device 110. These steps can be executed by key generators located on the two separate devices. The sets of keys can each be asymmetrical encryption keys including a public key and a matched private key. The sets of keys can each be ephemeral keys that are discarded after use or upon shut down of either device. These steps can involve the generation of an asymmetric key pair including a public key 401 and a matched private key 402 on computing device 130, and the generation of an asymmetric key pair including a public key 404 and a matched private key 405 on external biometric reader and verification device 110. The key pairs can be generated in either order, but in specific embodiments, the external biometric reader and verification device 110 will generate a key pair in response to receiving public key 401 from computing device 130. The matched private key is held in memory by computing device 130 while public key 401 is intended for transmission off the device.

Ladder diagram 400 continues with a query message 403 sent from computing device 130 to external biometric reader and verification device 110. Query message 403 can be sent as soon as a connection is detected on a port intended for connection to devices such as device 110 or when a user issues a command to do so. For example, as soon as a USB connection is connected to a USB port on a computing device and the device detects a USB connection, the computing device can send a query message out over the detected USB connection. Query message 403 can include a certificate request and a copy of the first public key 401. The certificate request, illustrated by a question mark in the diagram, can be a message which instructs external biometric reader and verification device 110 to sign a certificate for authenticating the device to the computing device.

Ladder diagram 400 continues with the signing 406 of a certificate with a private signing key on external biometric reader and verification device 110. The certificate can include an identification of the device and a public key 404 generated by the device. The certificate can be signed by a cryptographic signature algorithm in which the data that comprises the certificate is operated upon by the values that represent the private signing key. The resulting signed certificate can be verified by a public verification key associated with the private signing key. In the illustrated case, the signed certificate is transmitted back to the computing device 130 in a signed certificate message 407. As illustrated, the signed certificate message 407 can include a copy of public key 404. However, as mentioned previously, the public key could also be part of the content of the certificate.

Ladder diagram 400 continues with the verification 408 of the certificate with a public verification key on computing device 130. The verification of the certificate can render public key 404 available for authenticated use on computing device 130. The public key 404, private key 402, public key 401, and various combinations thereof can be used by a key generator on computing device 130 to execute a shared private key generation algorithm. At the same time, the public key 401, private key 405, public key 404, and various combinations thereof can be used by a key generator on external biometric reader and verification device 110 to execute the same shared private key generation algorithm. As a result, both devices will generate shared private key 409. The steps can be conducted simultaneously or asynchronously. Regardless, once the shared secrets are generated, they can be used to encrypt and/or authenticate messages sent between the two devices. As such, subsequent messages sent between the two devices can be both authenticated and encrypted.

Ladder diagram 400 continues with the transmission of a re-provision command 410 from the computing device 130 to the external biometric reader and verification device 110. The re-provision command can be issued each time the computing device is connected to an external device. The re-provision command can force a deletion of all the biometric information stored on external biometric reader and verification device 110. The command can be the first message sent between the two devices that is authenticated using the shared secret. In accordance with embodiments disclosed above, the message with the re-provision command 410 can be sent using an HMAC to allow for the message to be authenticated while keeping the MAC and shared secret secure. In alternative embodiments, the external device can be configured to automatically delete all biometric information stored on the device when it is first paired with a new computing device, without waiting for the receipt of a re-provision command from the computing device.

Ladder diagram 400 continues with two related and optional steps 411 and 412. The two steps combine as an additional check on the authenticity and security of the connection. In step 411 a check message 411 is set with a request to get a template count from the external biometric reader and verification device. The template count can be a count of the number of entries in the library of biometric data stored on the device. The message can be encrypted with a nonce using an HMAC derived from the shared secret. In response, the external biometric reader and verification device 110 can authenticate the check message 411 via its knowledge of the shared secret and obtain the nonce. The nonce can then be used as the MAC for future applications of the HMAC to messages sent between the devices. Device 110 can then generate a check response message 412 providing a count of the number of templates in the library. Device 110 can use the nonce in application of the HMAC to the check response message 412. Upon receiving the check response message 412, the computing device 130 can then authenticate the check response message 412 to verify that the number of templates in the library is zero using its knowledge of the nonce and shared secret. The number will be zero if the re-provision message was appropriately acted upon. This additional level of security creates a shared nonce for a round of communication between the devices and makes sure that the message authentication/encryption function is operational for more sensitive information between the two devices.

In specific embodiments of the invention in which the computing device includes an operating system, the operating system of a computing device can undergo a minor modification or receive a minor augmentation in order to interoperate with the external devices disclosed herein. The modification can be made to a hardware abstraction layer of the operating system. The portion of the hardware abstraction layer that is modified can be a driver for a specific port or wireless interface used to communicate over the communicative connection with the external device. For example, if the external port were a USB connection the portion of the hardware abstraction layer that is modified could be a standard USB driver of the operating system. The modification will also depend on the type of operating system that is on the computing device.

A biometric operation request, for instance, enrollment, authentication or deletion can be initiated from the operating system on the computing device. The request can be interpreted as a Remote Procedure Call (RPC) and can be transferred to the external device via a communicative connection such as a USB connection. When the external device receives the Remote Procedure Call (RPC), it interprets the call to the request and controls the biometric reader to operate in the mode as originally requested by the operating system, and then sends back the response from the biometric reader.

Figure 5:
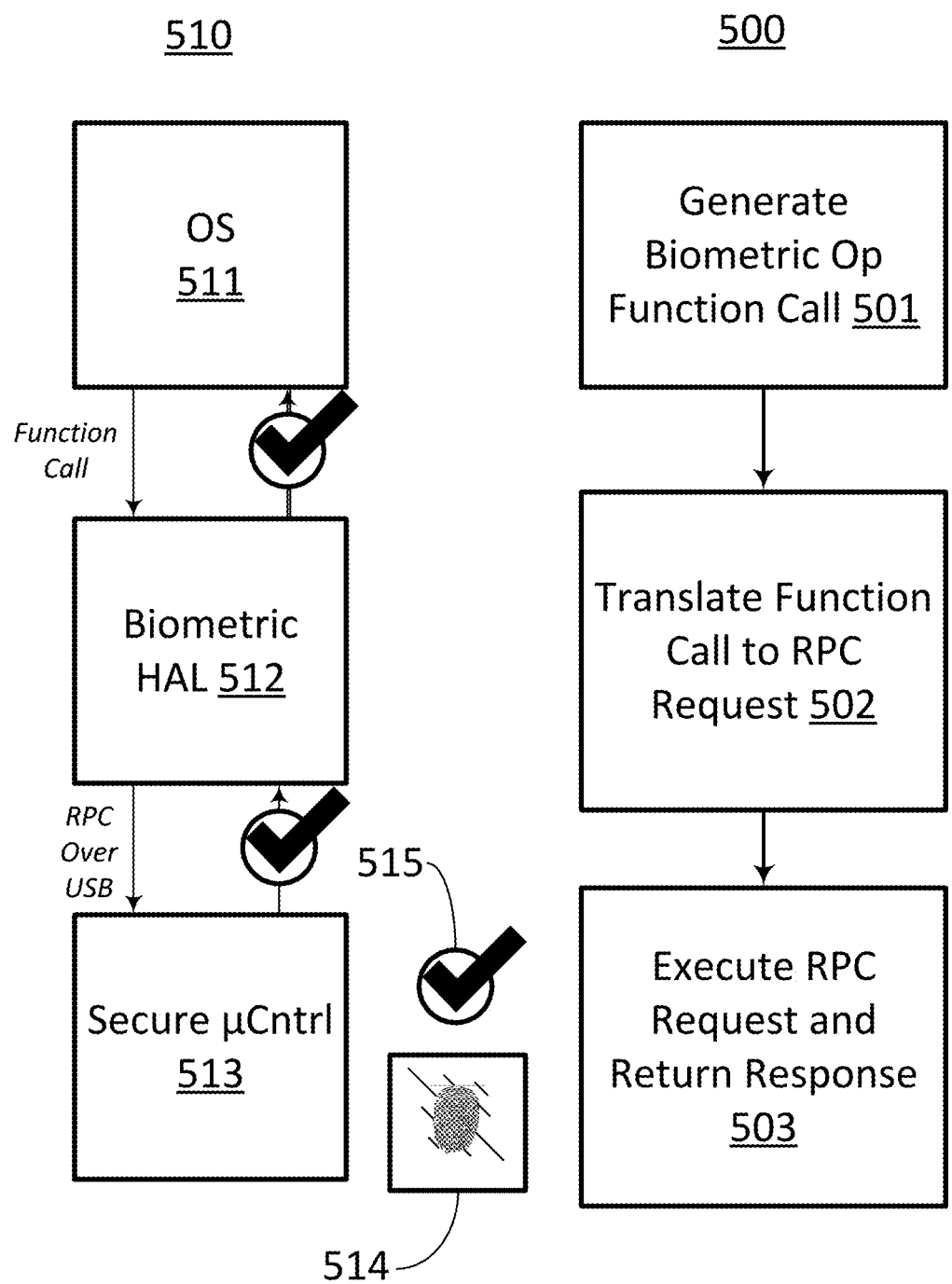
FIG. 5 illustrates a block diagram of modifications to an operating system of a multiuser computing device and an associated flow chart for a set of methods in accordance with specific embodiments of the invention disclosed herein.

FIG. 5 provides a flow chart 500 and an accompanying block diagram 510 of a specific example of this process in which the operating system 511 is in communication with a secure microcontroller 513 on the external device via a biometric device hardware abstraction layer 512. As illustrated, the operating system generates a biometric operation function call in a step 501. Subsequently, the biometric device hardware abstraction layer 512 translates the function call to an RPC request in a step 502. Then, the secure microcontroller 513 executes the remote procedure call and returns a response in step 503. In a basic example, the function call will be an identity verification request where a user label is provided as an element of the function call. The secure microcontroller will then compare a sample biometric 514 against a template associated with that user label and provide a function return in the form of an identity verified function return or an identity not verified function return. An identity verified function return 515 is illustrated in the figure. The function return can be a Boolean value indicating whether the identity was verified. Both the RPC and the function return can be packaged in operational messages that are encrypted/authenticated using the approaches described above such as those used on the check message in FIG. 4.

The following specific scenarios are in accordance with FIG. 5 and involve a biometric reader in the form of a fingerprint reader and a modification to an operating system in the form of a set of modified hardware abstraction layers. In these scenarios the operating system is an Android operating system and the code snippets are provided in the C programming language. These examples can be modified to substitute different biometrics in place of the fingerprint, and minor modifications can be made to extend the example to alternative operating systems such as the iOS, Windows, DOS, Unix, Linux operating systems, or to alternative programming languages.

A scenario involving an enrollment process in accordance with FIG. 5 and in which the biometric is a fingerprint can begin with the operating system prompting a user to place their finger on the fingerprint reader. The operating system can display, or otherwise provide this prompt, using a display on the computing device or on the external device. At the same time, the operating system will need to prepare the fingerprint reader to accept the fingerprint. The following paragraphs provide a specific example of this process that is in keeping with specific embodiments represented by FIG. 5.

The process of using a fingerprint reader to accept a fingerprint for purposes of enrollment can begin with an enroll( ) function call to a fingerprint HAL and the translation of that function call to an RPC by the fingerprint HAL. The operating system can generate the enroll( ) function call upon an administrator triggering an enrollment procedure on the computing device. The process to this point is an example execution of step 501 in which the function call is an enroll function call. The fingerprint HAL can then create a CMD_ENROLL command packet. The definition of the structure of the command packet and the code to create a CMD_ENROLL command packet 600 is provided in FIG. 6. The fingerprint HAL can then transmit the command packet to a lower-level fingerprint USB HAL. The lower-level fingerprint USB HAL can then convert the command packet into an RPC request. The definition of the structure of RPC request 700 is provided in FIG. 7 where the name of the RPC request is clover_usb_message. The conversion of the command packet into an RPC request of the structure provided by 700 can be done using the conversion code 710 also provided in FIG. 7. After the conversion, the data can be sent over a USB connection using a usb_device_send_data(struct usb_device *)dev, &usb_msg) function call. The process to this point is an example of the execution of steps 501 and 502 where the enroll( ) function call has been converted to an RPC request.

The process can continue with the external device receiving and acting upon the RPC request as in step 503. Upon receiving the enroll request, a secure microcontroller on the external device can switch the state machine of the fingerprint reader to start the collection of a fingerprint template. At this time, the user will have placed a finger on the fingerprint reader as prompted by the operating system, and the fingerprint reader will capture an image of the user's fingerprint and inform the secure microcontroller how many captures are left. The secure microcontroller can then send this information back over USB. The fingerprint USB HAL receives this RPC response using a usb_device_send_data ((struct usb_device *)dev, &usb_msg) function call, then converts the RPC response into the return result of the fingerprint capture and transmits to the upper-level fingerprint HAL using the return conversion code 720 provided in FIG. 7.

In response, the fingerprint HAL can receive this result and notify the operating system that the enrollment is in progress and the number of captures remaining in order to complete enrollment. The operating system can then inform the user once a template has been captured to lift the finger and place it on the fingerprint reader again. The scenario can continue with the process being repeated until all the required images are successfully captured. The secure microcontroller can then store the fingerprint templates in a secure memory, such as a Quad SPI flash, and send the operating system information that the enrollment is done. The secure microcontroller can also send the operating system an identifier for the finger associated with the enrollment to use as a label for later verification of the same user using the same finger. The operating system can then inform the user that enrollment has been completed.

An example authentication process in accordance with FIG. 5 and in which the biometric is a fingerprint can again begin with the operating system prompting a user to place their finger on the fingerprint reader. In this example, the operating system can make an authenticate( ) function call to the fingerprint HAL. The fingerprint HAL can then create a CMD_IDENTIFY command and transmit the command to the lower-level fingerprint USB HAL. The lower-level Fingerprint USB HAL can then convert the command packet into a clover_usb_message RPC request. After the conversion, the data is sent over USB using the usb_device_send_data((struct usb_device *)dev, &usb_msg) function call. Upon receiving the authentication command, the secure microcontroller can switch the state machine of the fingerprint reader to start the identification of a fingerprint template. At this time, a user will have placed a finger on the fingerprint reader as instructed by the operating system, and the fingerprint reader can then capture the image of the user's fingerprint and compare the sample with all stored fingerprint templates. If there is one template matched, the secure microcontroller is informed of the matched finger ID; otherwise, it informs the secure microcontroller that there is no template matched. The secure microcontroller can then send this information back over USB. The fingerprint USB HAL can receive this RPC response using the usb_device_send_data((struct usb_device *)dev, &usb_msg) function call, then converts the RPC response into the matching result and transmits the data to the upper-level fingerprint HAL. The fingerprint HAL can then notify the operating system of the result. The code to notify operating system 800 is provided in FIG. 8. The operating system can then make a decision on whether the user can obtain access depending on the result provided by the fingerprint HAL.

An example deletion process in accordance with FIG. 5 and in which the biometric is a fingerprint can begin with a user clicking on a delete button associated with one finger stored by the system. The operating system can then make a remove( ) function call to the fingerprint HAL with a label for the finger ID that the user has identified. The fingerprint HAL could then create a [CMD_STORAGE_TEMPLATE, ARG_DELETE] command and transmits it to the lower-level Fingerprint USB HAL. The lower-level Fingerprint USB HAL can then convert the command packet into a clover_usb_message RPC request. After the conversion, the data is sent over USB using the a usb_device_send_data ((struct usb_device *)dev, &usb_msg) function call. Upon receiving the deletion command, the secure microcontroller could remove the biometric associated with the finger ID specified from the secure memory, and then sends back a confirmation of successful removal over USB. The fingerprint USB HAL could then receive this RPC response using the usb_device_send_data((struct usb_device *)dev, &usb_msg) function call, then converts the RPC response into the removal result and transmits the data to upper-level fingerprint HAL. The fingerprint HAL could then notify the operating system that the fingerprint template was deleted, and the operating system could delete the biometric from the system.

An example cancellation process in accordance with FIG. 5 and in which the biometric is a fingerprint can begin with the operating system making a cancel( ) function call to the fingerprint HAL. The fingerprint HAL could then create a CMD_CANCEL command and transmits it to the lower-level fingerprint USB HAL. The lower-level fingerprint USB HAL could then convert the command packet into a clover_usb_message RPC request. After the conversion, the data could be sent over USB using the usb_device_send_data((struct usb_device *)dev, &usb_msg) function call. Upon receiving the cancellation command, the secure microcontroller could cancel any fingerprint operations in progress and return the fingerprint reader to an idle state.

An example re-provisioning process in accordance with FIG. 5 and in which the biometric is a fingerprint can begin with the operating system making a re-provision( ) function call to the fingerprint HAL. The fingerprint HAL could then create a [CMD_STORAGE_TEMPLATE, ARG_ID] command and transmit it to the lower-level fingerprint USB HAL. The lower-level fingerprint USB HAL converts the command packet into a clover_usb_message RPC request. After the conversion, the data is sent over USB using the usb_device_send_data((struct usb_device *)dev, &usb_msg) function call. Upon receiving the re-provision command, the secure microcontroller could delete all fingerprint templates stored in the secure memory.

An example enumeration process in accordance with FIG. 5 and in which the biometric is a fingerprint can begin with the operating system making an enumerate( ) function call to the fingerprint HAL. The fingerprint HAL could then create a [CMD_STORAGE_TEMPLATE, ARG_ID] command and transmit it to the lower-level fingerprint USB HAL. The lower-level fingerprint USB HAL converts the command packet into a clover_usb_message RPC request. After the conversion, the data is sent over USB using the usb_device_send_data((struct usb_device *)dev, &usb_msg) function call. Upon receiving the enumeration command, the secure microcontroller could read all the fingerprint templates stored on the secure memory and send back the number of stored templates over USB. The fingerprint USB HAL receives this RPC response using the usb_device_send_data ((struct usb_device *)dev, &usb_msg) function call, then converts the RPC response into the result and transmits the data to an upper-level fingerprint HAL. The fingerprint HAL then notifies the operating system of the number of fingerprint templates that are enrolled. The enumeration process can be used as part of the final step of the setup phase for a secure connection between the external device and the computing device where the computing device checks to make sure that the external device responded properly to a re-provisioning function call.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure were generally directed to an external biometric reader which was physically distinct from the computing device for which it was operating, the reader does not necessarily need to be entirely external to the computing device and many of the benefits expressed by certain embodiments disclosed herein would still be realized by the resulting system. For example, any embodiment in which there is a connection between the access control system of the computing device to the biometric verification system would benefit from the secure connection and message authentication approaches disclosed above. Furthermore, although a computing device used as an example throughout this disclosure was a multiuser computing device having an operating system where access to at least one service of the operating system is predicated on the verification of a user's identity via biometric information, the computing system does not need to include an operating system as any electronic or computerized element for which access can be predicated on a verification signal could benefit from some of the embodiments disclosed herein. These and other modifications and variations to the present invention may be practiced by those skilled in the art, without departing from the scope of the present invention, which is more particularly set forth in the appended claims.

What is claimed is:

1. A computerized method for authenticating an external biometric reader and verification device to a computing device comprising:
    transmitting, from the computing device to the external biometric reader and verification device, a query message including a certificate request and a first public key generated by the computing device;
    receiving, by the computing device, from the external biometric reader and verification device and responsive to the query message, a signed certificate message with a signed certificate signed with a private signing key stored in a secure microcontroller on the external biometric reader and verification device, wherein the signed certificate message includes a second public key generated by the external biometric reader and verification device;
    verifying, on the computing device, the signed certificate using a public verification key stored in the computing device associated with the private signing key stored in the external biometric reader and verification device;
    wherein verification of the certificate renders the second public key generated by the external biometric reader and verification device available for authenticated use on the computing device;
    generating, by the computing device and using the authenticated second public key generated by the external biometric reader and verification device, a shared secret key;
    wherein the shared secret key is the same as one generated in the external biometric reader and verification device using the first public key generated by the computing device.

2. The computerized method of claim 1, wherein the external biometric reader and verification device is pre-provisioned with the private signing key from a root certificate authority and the computing device is pre-provisioned with the associated public verification key.

3. The computerized method of claim 1, wherein the private signing key is injected on the external biometric reader and verification device in a secure key injection facility.

4. The computerized method of claim 1, wherein the query message is transmitted responsive to a connection being detected on a port intended for connection to external biometric reader and verification devices.

5. The computerized method of claim 1, wherein the query message is transmitted responsive to receiving a user command from the computing device to do so.

6. The computerized method of claim 1, wherein the certificate request comprises a message which instructs the external biometric reader and verification device to sign a certificate for authenticating to the computing device.

7. The computerized method of claim 1, wherein the certificate includes an identification of the external biometric reader and verification device.

8. The computerized method of claim 1, wherein the signed certificate message includes a copy of the second public key generated by the external biometric reader and verification device or the second public key is part of the content of the certificate.

9. The computerized method of claim 1, further comprising
    transmitting, from the computing device to the external biometric reader and verification device, a re-provision command;
    wherein the re-provision command causes a memory used to store biometric information on the external biometric reader and verification device to be cleared.

10. The computerized method of claim 1, further comprising:
    generating, in the computing device, a shared secret using a shared secret key generator algorithm and data from the signed certificate, the shared secret being the same as one generated in the external biometric reader and verification device; and
    transmitting, from the computing device to the external biometric reader and verification device, a re-provision command;
    wherein the re-provision command is the first message sent between the two devices that is authenticated using the shared secret.

11. The computerized method of claim 10, wherein the shared secret key generator algorithm is a Diffie-Hellman key generator algorithm.

12. The computerized method of claim 10, wherein the shared secret is used to encrypt and/or authenticate messages sent between the external biometric reader and verification device and the computing device, in a way that subsequent messages sent between the two devices are both authenticated and encrypted.

13. A computerized method for establishing trust between an external biometric reader and verification device and a computing device comprising:
    in a setup phase:
    (i) storing a private signing key on the external biometric reader and verification device;
    (ii) receiving, by the external biometric reader and verification device from the computing device, a certificate request;
    (iii) generating, by the external biometric reader and verification device, a signed certificate by signing a certificate with the private signing key and in response to receiving the certificate request; and
    (iv) transmitting, from the external biometric reader and verification device, the signed certificate to the computing device,
    wherein the signed certificate is verified using a public verification key stored in the computing device, enabling authentication of the external biometric reader and verification device;

transitioning to an operating phase predicated on verification of the certificate, by switching from the setup phase to an operational phase; and in the operational phase:
(i) receiving and verifying, in the external biometric reader and verification device, a sample biometric;
(ii) comparing, in the external biometric reader and verification device, the sample biometric to a library of stored biometrics to complete biometric identity verification of a user; and
(iii) upon verifying the identity of the user, transmitting, from the external biometric reader and verification device, an authorized user message to the computing device,
wherein the authorized user message facilitates access to at least one service of the computing device.

14. The computerized method of claim 13 wherein access to the at least one service of the computing device is predicated on both the biometric identity verification conducted by the external biometric reader and verification device during the operational phase and the authentication of the external biometric reader and verification device during the setup phase.

15. The computerized method of claim 13 wherein the private signing key is stored in a secure memory on the external biometric reader and verification device.

16. The computerized method of claim 13 wherein the private signing key is injected into a secure memory on the external biometric reader and verification device in a key injection facility when the device is manufactured.

17. The computerized method of claim 13 wherein signing the certificate is conducted by a secure microcontroller on the external biometric reader and verification device using the private signing key stored in a secure memory on the external biometric reader and verification device.

18. The computerized method of claim 13, further comprising:
receiving, by the external biometric reader and verification device from the computing device, a request for identity verification,
wherein receiving and verifying the sample biometric is performed subsequent to receiving the request for identity verification.

19. The computerized method of claim 13 wherein verifying the signed certificate by the computing device includes checking, using the public verification key, if the certificate of the external biometric reader and verification device was issued by a root certificate authority.

20. The computerized method of claim 13 wherein the root certificate authority is trusted by the computing device based on a formalized relationship between a manufacturer of the computing device and a manufacturer of the external biometric reader and verification device.

21. A computerized method for controlling access to an operating system in a computing device comprising:
storing a certificate on an external secure microcontroller;
transmitting, from the external secure microcontroller, the certificate to the computing device in a setup phase via an external port of the computing device;
receiving and verifying, on the computing device, the certificate in the setup phase;
switching, by the computing device, to an operational phase based upon verifying the certificate; and
controlling access to the operating system by the computing device, based on receiving an authentication signal in the operational phase,
wherein receiving the authentication signal results from:

(i) storing a set of biometric data on the external secure microcontroller;
(ii) receiving, on the external secure microcontroller, biometric sample data from a biometric reader;
(iii) verifying, on the external secure microcontroller, the biometric sample data against the set of biometric data; and
(iv) transmitting, from the external secure microcontroller responsive to verifying the biometric sample data, the authentication signal to the computing device.

22. The computerized method of claim 21, further comprising:
instantiating a first key generator on the external secure microcontroller;
instantiating a second key generator on the computing device;
generating, in the external secure microcontroller and the computing device, a shared secret key using the first and second key generators respectively;
encrypting, in the external secure microcontroller, the authentication signal with the shared secret key; and
decrypting, in the computing device, the authentication signal with the shared secret key.

23. The computerized method of claim 21, further comprising:
instantiating a first key generator on the external secure microcontroller;
instantiating a second key generator on the computing device;
generating, in the external secure microcontroller and the computing device, a shared secret key using the first and second key generators respectively; and
in the external secure microcontroller:
(i) deriving a message authentication code using the shared secret key; and
(ii) combining the authentication signal and the message authentication code prior to transmitting the authentication signal to the computing device.

24. The computerized method of claim 21, further comprising:
instantiating an ephemeral key generator on the computing device;
generating, on the computing device and using the ephemeral key generator, a public key and a private key;
wherein the public key is transmitted to the external secure microcontroller based upon verifying the certificate.

25. The computerized method of claim 21, further comprising:
sending, from the computing device, a re-provision command from the external secure microcontroller upon verifying the certificate; and
erasing, in the external secure microcontroller, an old set of biometric information in response to the re-provision command.

26. The computerized method of claim 21, further comprising:
instantiating a hardware abstraction layer on the computing device;
sending a biometric operation request from the operating system to the hardware abstraction layer;
generating, using the hardware abstraction layer, a remote procedure call for the biometric operation request;
transmitting the remote procedure call from the hardware abstraction layer to the external secure microcontroller; and verifying received biometric data on the external secure microcontroller in response to the remote procedure call.

\* \* \* \* \*